United States Patent [19]

Turetsky

[11] 4,352,735

[45] Oct. 5, 1982

[54] FILTER-PURIFIER CARTRIDGE

[76] Inventor: Isadore Turetsky, 23940 Welby Way, Canoga Park, Calif. 91307

[21] Appl. No.: 259,920

[22] Filed: May 4, 1981

[51] Int. Cl.³ .................... B01D 23/06; B01D 27/02
[52] U.S. Cl. ................................ 210/238; 210/266; 210/282; 210/314
[58] Field of Search .............. 210/232, 238, 282, 266, 210/314, 316, 450, 451, 452, 454, 489, 315

[56] References Cited

U.S. PATENT DOCUMENTS

| | | | |
|---|---|---|---|
| 1,412,790 | 4/1922 | Uehling | 210/450 |
| 1,941,895 | 1/1934 | Hennings | 210/450 |
| 3,064,819 | 11/1962 | Jones | 210/282 |
| 3,313,421 | 4/1967 | Falkenberg | 210/314 |
| 3,895,083 | 7/1975 | Yeagle | 210/232 |
| 4,062,781 | 12/1977 | Strauss | 210/450 |
| 4,107,045 | 8/1978 | Turetsky | 210/314 |
| 4,138,339 | 2/1979 | Turetsky | 210/450 |
| 4,166,793 | 9/1979 | Turetsky | 210/450 |
| 4,178,250 | 12/1979 | Turetsky | 210/450 |
| 4,196,086 | 4/1980 | Turetsky | 210/232 |

FOREIGN PATENT DOCUMENTS 796917  6/1958  United Kingdom ................ 210/282

*Primary Examiner*—Ernest G. Therkorn

[57] ABSTRACT

A filter-purifier cartridge having a purifier element which can be coupled to one end section of a tubular filter element, or can be adapted to retain filtering means within its hollow core, or be used separately; the purifier element with or without said filtering means, being manually separable from and joined to a top wall member disposed at one end section of said element, the cylinder of that purifier element which retains the filtering means within its hollow core can be adapted to function as the cartridge housing.

4 Claims, 12 Drawing Figures

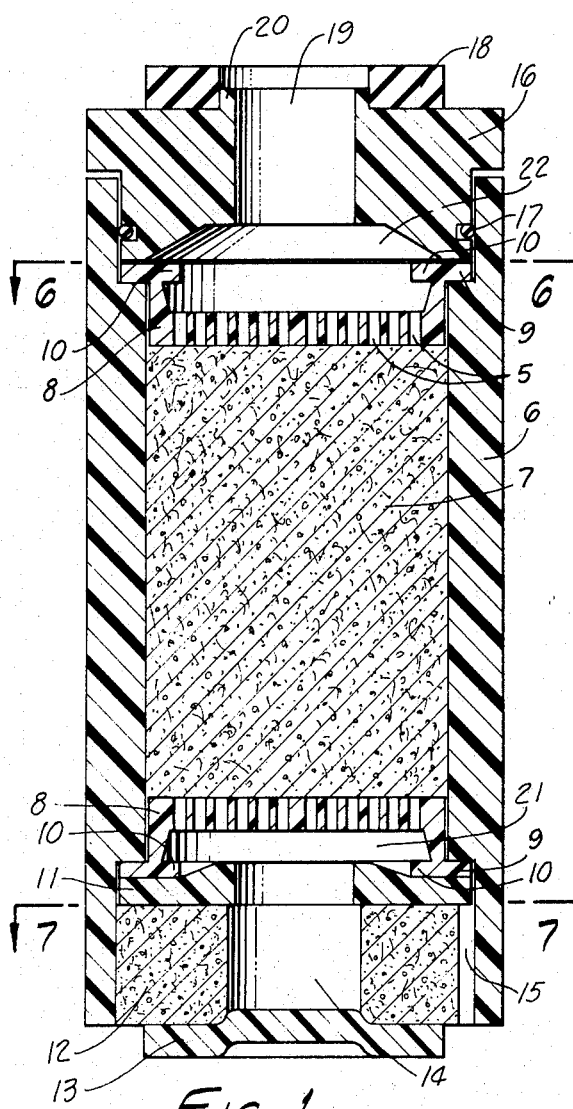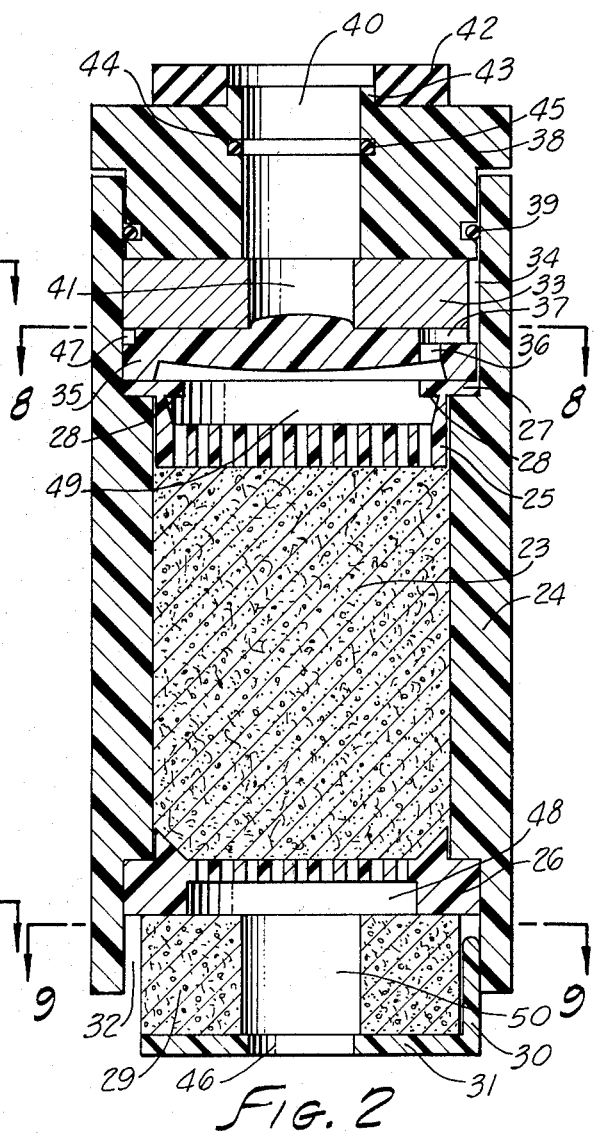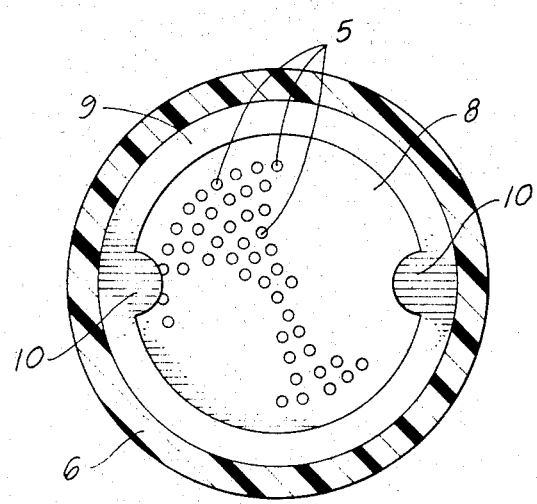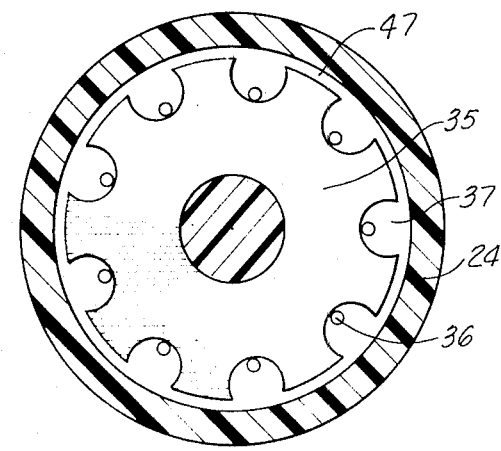
FIG. 1.
FIG. 2.
FIG. 6.
FIG. 8.

FILTER-PURIFIER CARTRIDGE

FIELD OF THE INVENTION

This invention relates to a filter-purifier cartridge, and since it finds particular utility in the field of water filtration and purification, embodiments hereinafter described as illustrative of the invention and the advantages thereof are understood to be not restricted to such use.

OBJECTS OF THE INVENTION

An object of my invention is to provide a relatively inexpensive filter-purifier cartridge with the optional use of a unitary purifier element, or the use of a purifier element which can be emptied and refilled with purifying medium by manual means. In addition, the optional provision for manual separation and replacement of the filter element.

Another object of my invention is to provide an optional unitary filter-purifier cartridge having a manually separable and manually joined top wall member, the filtering means retained within the purifier element.

Another object of my invention is to provide a filter-purifier cartridge having a self contained purifier element which can be manually separated from and joined to a top wall member.

Still another object of my invention is to provide different top wall members and lower end closers to adapt the assembled filter-purifier elements to different housings.

Another object of my invention is to provide a filter-purifier cartridge having a manually separable and assembled top wall member in which the purifier element can be made to function as the cartridge housing.

Embodiments of my invention capable of accomplishing the foregoing objects and providing the advantages contemplated from them and other advantages will become more apparent after studying the detailed description of the following specification which may be readily understood by reference to the accompanying drawings.

BRIEF DESCRIPTION OF THE DRAWINGS:

FIG. 1 is a side elevation sectional view of the filter-purifier cartridge of my invention.

FIG. 2 is generally similar to FIG. 1 but shows a filter assembly within the upper end section of the purifier element. In addition the lower filter element is retained and spaced by different means.

FIG. 6 is a transverse sectional view taken along line 6—6 of FIG. 1.

FIG. 8 is a transverse sectional view taken along line 8—8 of FIG. 2.

Figure 3:
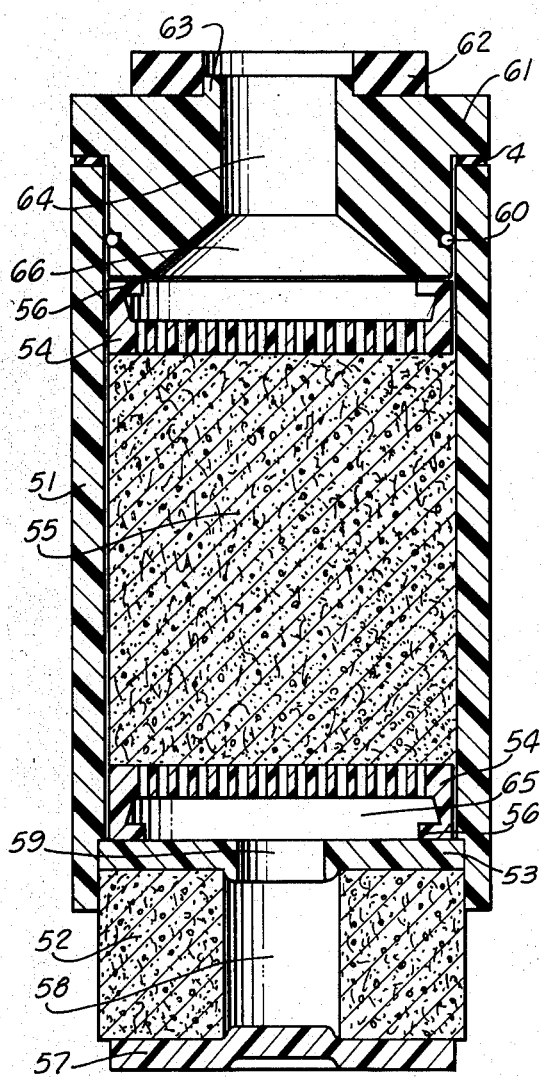
FIG. 3 illustrates the purifier element coupled to an external filter element.

DETAILED DESCRIPTION OF THE DRAWINGS:

Referring to FIG. 1 which is for illustrative purposes only, the numeral 6 indicates the purifier element having purifying medium 7 contained within its hollow core by means of the foraminous cups 8. The skirt of each cup 8 has a sliding frictional fit with the internal wall of the purifier element 6, the outer rim 9 of each cup resting against its associated internal shoulder of the purifier element 6 thereby limiting the cup travel within said element. Each cup has optional tabs 10 to facilitate manual removal of said cup. Bearing against the rim 9 of the lower perforated cup is washer 11 which is contiguous to one end wall of the tubular filter element 12. The closure 13 seals the exposed outer end of hollow filter core 14. The outer perimeter of filter element 12 has a plurality of sinuous configurations so that a series of circumferentially disposed vertical passages 15 are formed when said filter element 12 is inserted into the lower end section of the purifier element. Disposed at the upper end section of the purifier element is the top wall member 16 which retains an "O" ring 17 within a groove to prevent leakage of fluid between the sidewalls of said top wall member and the purifier element. The ring gasket 18 is disposed on top wall 16 and surrounds the discharge passage 19 of the assembled cartridge, said gaskket being preferably but not necessarily positioned by means of the ring projection 20. It will be obvious to one skilled in the art that the lower foraminous inverted cup 8 can have a loose sliding fit within the purifier element, and that a frictional fit of washer 11 or filter 12 within said purifier element will still contain the purifying medium 7 within said purifier element.

In operation the filter-purifier cartridge as shown is subjected to axial compression after the cartridge is inserted in its housing. The cartridge housing is not part of my invention and is not illustrated. It will be evident that, while the filter housing is not shown, one skilled in the art can easily adapt the illustrated cartridge to a hollow cylindrical housing having axially aligned inlet and outlet passages. One skilled in the art will also note that embodiments of the cartridge as shown are adapted to a common type of housing which is screwed onto a double ported end section containing an "O" ring to seal the single open end of said housing. In addition, the double ported end section of the cartridge housing assembly can be modified so that the top wall member can be an integral part of said double ported end section. Furthermore, the lower end section wall of the purifier element can be extended sufficiently beyond the filter element 12 so that a stepped end closer can be used in place of closure 13, said stepped closer sealing the lower end of filter core 14 and permitting ingress of fluid to said filter element.

With the filter-purifier cartridge assembled as illustrated, fluid to be filtered and purified flows radially through the permeable porous filter 12 via passages 15 and enters the hollow core 14 of said filter. The fluid then flows through the aperture of washer 11 and enters collector chamber 21 of the lower perforated inverted cup. The fluid continues to flow through the perforations of said lower cup and through the hollow core of purifier element 6 wherein the purifying medium 7 is contained. The fluid then enters collector chamber 22 via the perforations 5 in upper cup 8. The fluid then exits through the discharge passage 19, said discharge passage communicating with the discharge passage of the cartridge housing. The ring gasket 18 surrounding the cartridge discharge passage and the cartridge housing discharge port prevents unprocessed fluid from discharging through said cartridge housing discharge passage.

FIG. 2 is generally like that of FIG. 1 but shows another means for spacing and retaining the filter within the lower end section of the purifier element. In addition, a permeable porous filter is retained and spaced within the upper end section of the purifier element. Purifying medium 23 is contained within the hollow core of purifier element 24 by means of the upper perforated cup 25 and lower inverted perforated cup 26, both cups having a preferable but not necessary sliding frictional fit with the internal wall of said purifier element 24. The outer rim 27 of cup 25 which rests against an internal shoulder within the purifier element limits the travel of said cup within the purifier element. An optional pair of tabs 28 can be used to facilitate manual removal of the perforated cup 25. The lower inverted perforated cup 26 rests against the internal shoulder within the lower end section of the purifier element. The filter element 29 is retained and spaced within the lower end section of the purifier element by means of a series of projections 30 which are integral with the washer 31 and emanate from the outer end of said washer; the projections 30 having a preferable sliding frictional fit within the lower end section of said purifier element. It will be evident that filter 29 and washer 31 can be removed, inverted and reinserted so that washer 31 rests against cup 26. The passages 32 permit the entry of fluid around the outer circumference of filter element 29. The optional filter element 33 within the upper end section of the purifier element has a series of sinuous configurations around its outer circumference to form vertical passages 34 and rests against adapter 35 which in turn bears against rim 27, of the upper perforated cup 25. The adapter 35 has a series of passages 36 which communicate with a series of recesses 37 within the upper surface of said adapter, said recesses communicating with passages 34 via annular channel 47 which is located around the section of the adapter having said recesses 37. The manually separable top wall member 38 which rests against the filter element 33 has an "O" ring 39 retained within a groove in its outer circumference. The "O" ring 39 prevents leakage of fluid between the outer wall of the inserted top wall section and the internal wall of the upper end section of the purifier element. The concentric discharge passage 40 of top wall member 38 communicates with the hollow core 41 of filter element 33. A ring gasket 42 is disposed on the top wall 38 and surrounds the discharge passage 40. The ring gasket 42 can be kept in position by means of ring projection 43 as shown, by use of adhesive or other suitable means. An optional groove 44 can be used to retain the optional "O" ring 45 which also surrounds the discharge passage 40. A closure which can be inserted in aperture 46 in washer 31 is not shown.

One skilled in the art will observe that the cartridge as illustrated is adapted for a common type housing which is screwed onto a double ported end section having a tubular protrusion surrounding the discharge passage of the cartridge housing. The tubular protusion is inserted into the cartridge discharge passage 40 so that "O" ring 45 encircles said protrusion thereby preventing leakage of fluid between the sidewalls of said passage 40 and the tubular protrusion. The ring gasket 42 which bears against the wall of the double ported section of the cartridge housing can be obviated or can function as a second seal to prevent unprocessed fluid from entering the cartridge housing discharge passage. In addition, the inside end section of the cartridge housing has a tubular protrusion which is inserted into aperture 46. An "O" ring retained within the upper end section of the housing serves to prevent leakage of fluid when said housing is screwed onto the double ported end section. With the housing screwed onto the double ported end section, the internal end wall of said housing bears against washer 31 thereby sealing aperture 46.

In operation the cartridge as shown is subjected to axial compression after said cartridge is inserted in its housing. Fluid to be filtered flows through the permeable porous wall of the tubular filter 29 via passages 32 and enters the hollow core 50. Fluid then flows into collector chamber 48 of the inverted cup 26 thence through the perforations of said cup 26 and enters the hollow core of purifier element 24 containing purifying medium 23. The fluid flows through the core of purifier element 24 and enters passages 36 of adapter 35 by means of perforations and collector chamber 49 in cup 25. The series of recesses 37 which communicate with their associated passages 36 permit fluid to enter vertical passages 34 by means of annular channel 47 whence the fluid flows radially through the permeable porous filter 33 to enter the hollow core 41 of said filter. The fluid then flows through passage 40 of the top wall member, said passage 40 communicating with the discharge passage of the cartridge housing. It will be obvious to one skilled in the art that perforated cups 25 and 26 can be affixed to the purifier element cylinder by use of adhesive, fusion, or other suitable means to form a unitary purifier element.

FIG. 3 illustrates the purifier element 51 directly coupled to filter element 52. Purifying medium 55 is contained within the hollow core of the purifier element by means of upper and lower foraminous cups 54. The perforated cups have a preferably sliding friction fit with the internal wall of the purifier element making said purifier element self contained, as the purifying medium will not discharge from said element when the filter 52 and washer 53 are removed. Each cup has tabs 56 to facilitate manual removal. The upper end wall of filter 52 bears against washer 53 thereby preventing the flow of unfiltered fluid between said washer 53 and said filter end wall. The washer 53 rests against the lower internal shoulder of the purifier element, and can be affixed to said shoulder by adhesive or other suitable means. The extended hub of said washer 53 is inserted into the upper end of filter core 58 and can be used to maintain a spaced relationship between the wall of a filter having a relatively smaller diameter, and the internal wall of the purifier element. The closure 57 bearing against the exposed end of filter 52 seals the exposed hollow core 58 of said filter. The top wall member 61 retains an "O" ring 60 within a groove in its outer circumference to prevent leakage of fluid between the sidewalls of said top wall member and the purifier element. The optional ring gasket 4 disposed between the upper end wall of purifier element 51 and top wall member 61 can be used with or instead of "O" ring 60. The gasket 62 on top wall member 61 is kept in position by ring projection 63 of said top wall, and surrounds the concentric discharge passage 64 in said top wall. The gasket 62 also encircles the cartridge housing discharge port (not shown) when the cartridge as illustrated is subjected to compression within its housing. Fluid enters the cartridge through the permeable tubular filter 52 and flows into the hollow core 58 of said filter. The fluid then flows into the collector chamber 65 of the lower inverted cup via the aperture 59 through washer 53, and enters the hollow core of the purifier element containing the purifying medium 55 by means of the perforations in said lower inverted cup. Flow continues through the hollow core of the purifier element 51 and enters collector chamber 66 via the perforations in the upper cup whence it exits through discharge passage 64, and into the housing discharge passage which communicates with said passage 64.

Figure 4:
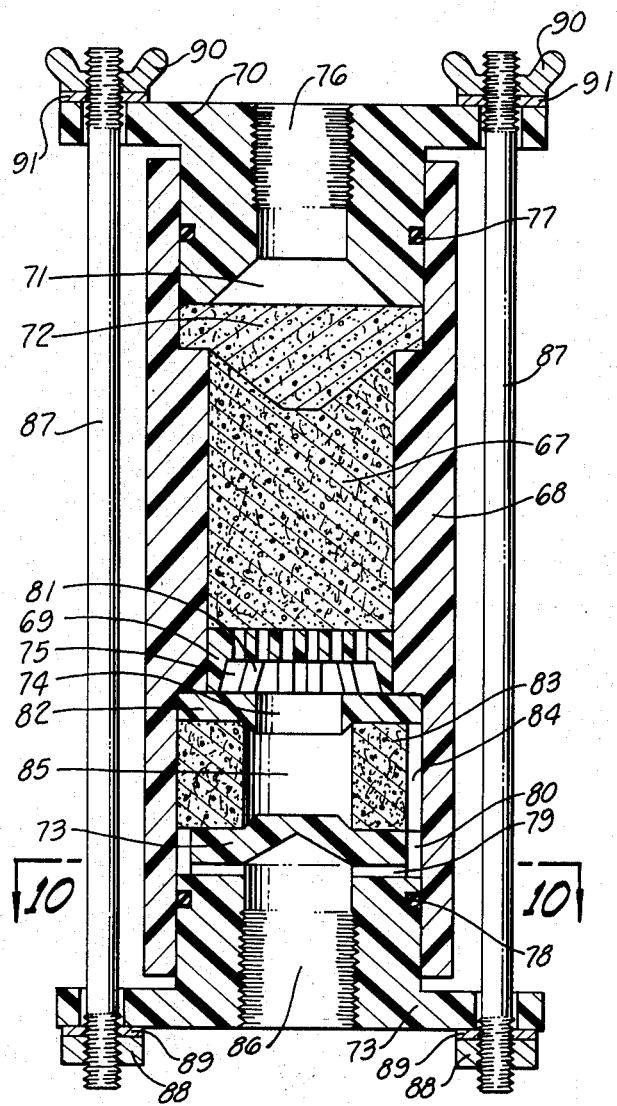
FIG. 4 shows an assembled filter-purifier cartridge, the purifier element functioning as the cartridge housing.

FIG. 4 shows still another adaptation of the purifier element in which the wall of the purifier element 68 also functions as the cartridge housing having manually removable top wall member 70 and bottom wall member 73. The purifying medium 67 is confined within the hollow core of the purifier element between upper permeable porous filter 72 and the inverted perforated cup 69. The upper filter 72 which has a preferable but not necessary sliding frictional fit within the upper end section of the purifier element rests against the internal shoulder within said upper end section. The top wall member 70 rests against filter element 72 so that fluid must flow through the permeable porous wall of said filter element to enter collector chamber 71 which communicates with the concentric discharge passage 76 in the top wall member 70. The top wall member has an "O" ring 77 retained within a groove in its outer circumference of the inserted section of said top wall, the "O" ring preventing leakage of fluid between the sidewalls of said top wall and the upper end section of the purifier element. The bottom wall member 73 has a similar "O" ring 78 retained in a groove in its larger inserted circumference to prevent passage of fluid between the sidewalls of said inserted section and the lower end section of the purifier element. The inserted section of the bottom wall member having the smaller diameter has a series of radial passages 79 which communicate with the annular passage 80 around said section, and with the concentric inlet passage 86 in the bottom wall member. The skirt of inverted perforated cup 69 has a series of optional slots 81 thereby adding flexibility to said skirt and facilitates insertion or removal of said cup. The washer 82 bearing against the lower internal shoulder of the purifier element supports the upper end wall of inserted filter element 83 thereby preventing the flow of unfiltered fluid between said upper end wall and said washer. The permeable porous tubular filter element 83 has a preferably but not necessarily sliding frictional fit within the internal lower end section of the purifier element. A series of vertical grooves 84 disposed in the outer circumference of filter element 83 communicate with the annular passage 80. The end wall of the smaller diametrical inserted section of the bottom wall member 73 bears against the lower end wall of filter element 83 thereby sealing the lower end of hollow core 85 of said filter. Each of the non inserted largest diametrical section of the top wall member 70 and bottom wall member 73 has a series of holes through which pass tie rods 87 which are threaded at each end as shown, a threaded nut 88 and its associated washer 89 at the lower end of each tie rod. Screwing down the threaded wing nuts 90 against their associated washers 91 at the upper end of tie rods 87 subject the inserted sections of top wall member 70 and the bottom wall member 73 to compression within the purifier element. The concentric inlet passage 86 of the botom wall member 73, and discharge passage 86 in the top wall member 70 are preferably threaded to receive the necessary fittings.

With the cartridge assembled as shown fluid enters inlet passage 86 and flows through radial passages 79 and into vertical grooves 84 via the annular channel 80. The fluid then flows through the permeable porous wall of tubular filter 83 and enters the hollow core 85 of said filter. Fluid then flows into chamber 75 of the inverted cup 69 via the aperture 74 in washer 82, and enters the core of purifier element 68 containing purifying medium 67 by means of the perforations in the inverted cup 69. The fluid continues flowing through the core of the purifier element and through the permeable porous filter 72 to enter collector chamber 71, and then exits through the concentric discharge port 76 which communicates with collector chamber 71.

It will be evident to one skilled in the art that washer 82 can be affixed to the purifier element by adhesive or other suitable means. Also, the upper filter element 72 can be affixed to the purifier element by adhesive or other means. In addition the upper end of filter 83 can be similarly affixed to the washer 82, thereby forming a unitary filter-purifier element having a manually removable top wall.

Figure 5:
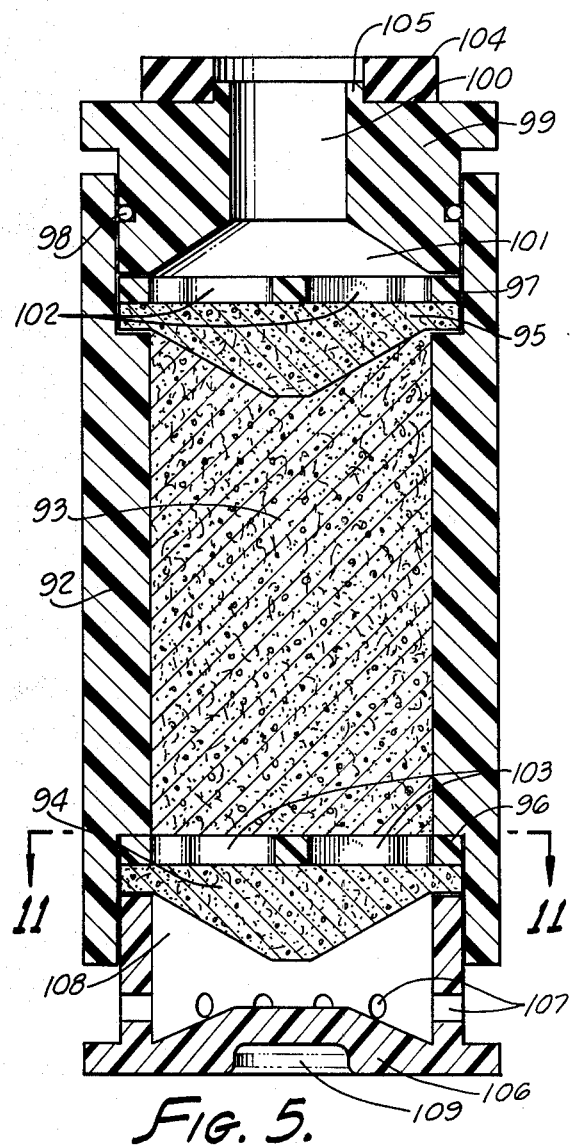
FIG. 5 shows the purifying medium confined between two permeable porous filters.

FIG. 5 illustrates still another adaptation of the purifier element to filtering means within its hollow cylinder. The purifier element 92 has purifying medium 93 confined within its hollow core by means of lower filter element 94 and upper filter element 95, both filter elements having a preferable but not necessary sliding frictional fit with the internal wall of said purifier element. The lower filter 94 rests against an optional support 96 having a plurality of spokes, said support bearing against the internal shoulder within the lower end section of the purifier element and having a plurality of ports 103. The upper filter element 95 rests against the upper internal shoulder of the purifier element. The optional support 97 has a plurality of spokes and rests against the upper end of filter 95. An "O" ring 98 retained in a groove within section of top wall member 99 prevents leakage of fluid between the sidewalls of the purifier element and said top wall member. The concentric discharge passage 100 in said top wall communicates with collector chamber 101 located above the ports 102 of the upper support 97. A ring gasket 104 disposed on top wall member 99 surrounds the discharge passage 100 and is preferably held in position by means of ring projection 105 of said top wall. The manually joined and separable end closer 106 has a series of radial passages 107 which communicate with chamber 108 within said closer. The inserted end wall of closer 106 bears against filter 94 as shown. The closer can also be made with a collar which will bear against the lower end wall of purifier element 92. The concentric recess 109 within the outer end wall of closer 106 can be used to center the assembled cartridge in its housing. The cartridge as shown is subjected to compression after it is inserted in the cartridge housing.

In operaton fluid flows into collector chamber 108 by means of passages 107 and continues to flow through permeable porous filter 94. The fluid then enters the hollow core of purifier element 92 containing purifying medium 93 via the ports 103 of supporting member 96. Fluid continues flowing through the core of purifying element 92 and through the permeable porous filter 95 to enter collector chamber 101 via ports 102 in supporting member 97. The fluid then enters discharge passage 100 which communicates with the cartridge housing discharge passage. The ring gasket 104 which surrounds discharge passage 100 also surrounds the discharge port of the cartridge housing, thereby preventing the flow of unprocessed fluid from said housing. It will be obvious to one skilled in the art that the filter elements and their optional support members can be affixed to the purifier element by adhesive or other suitable means to form a unitary filter-purifier cartridge having a manually separable top wall member. Also, perforated cups as shown in the previous diagrams, or perforated disks can be substituted for the filter elements and the optional support members thereby permitting use of the purifier element without filtering means. The perforated members can if desired be affixed to the purifier element by use of adhesive or other suitable means to form a unitary purifier element having a removable top wall member.

FIG. 6 is transverse sectional view taken along line 6—6 of FIG. 1, and shows the rim 9, the tabs 10, the perforations 5 in the upper perforated cup 8, and a section of the wall of purifier element 6.

Figure 7:
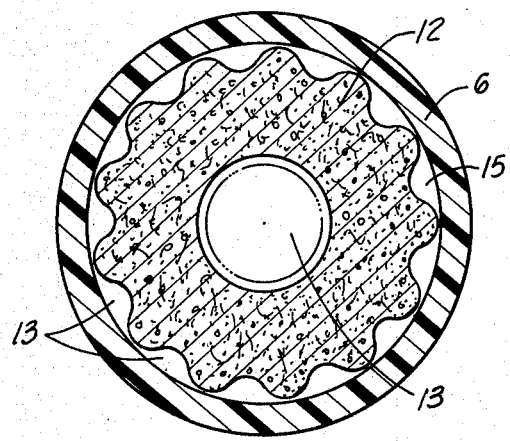
FIG. 7 is a transverse sectional view taken along line 7—7 of FIG. 1.

FIG. 7 is a transverse sectional view taken along line 7—7 of FIG. 1 and shows the sinuous configurations in the outside perimeter of filter element 12, the closure 13, the vertical passages 15 around the filter element, and the lower end section wall of the purifier element 6 which encircles the filter.

FIG. 8 is a transverse sectional view taken along line 8—8 of FIG. 2. Shown is the series of passages 36 in adapter 35, the passages 36 communicating with annular channel 47 by means of recesses 37. The upper end section wall of purifier element 24 encircles annular channel 47.

Figure 9:
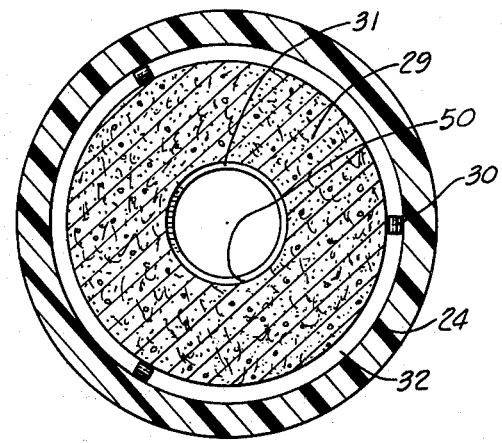
FIG. 9 is a transverse sectional view taken along line 9—9 of FIG. 2.

FIG. 9 is a transverse sectional view taken along line 9—9 of FIG. 2 and shows the lower filter element 29 with its hollow core 50. The passages 32 disposed around filter element are encircled by an end section wall of purifier element 24. Shown are projections 30 which space and retain the filter element 29 within the hollow core of the lower end section of purifier element 24. Also illustrated is a section of washer 31.

Figure 10:
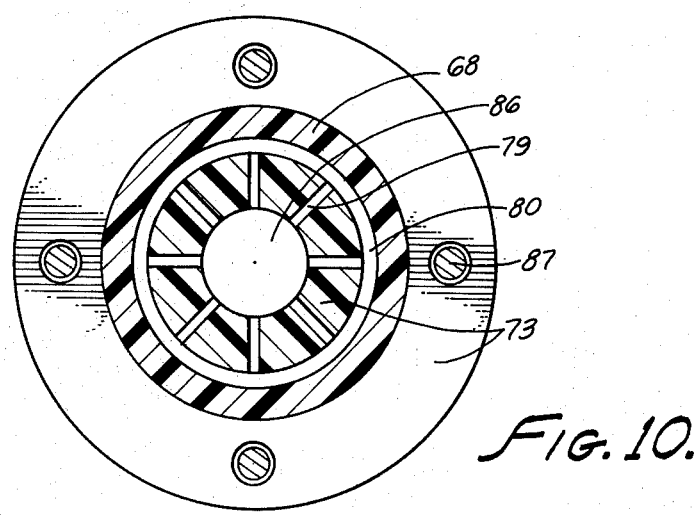
FIG. 10 is a transverse sectional view taken along line 10—10 of FIG. 4.

FIG. 10 is a transverse sectional view taken along line 10—10 of FIG. 4 and shows the radial passages 79 within the inserted section of bottom end wall member 73. The annular channel 80 which communicates with the hollow core 86 by means of the radial passages is also shown, as are the tie rods 87.

Figure 11:
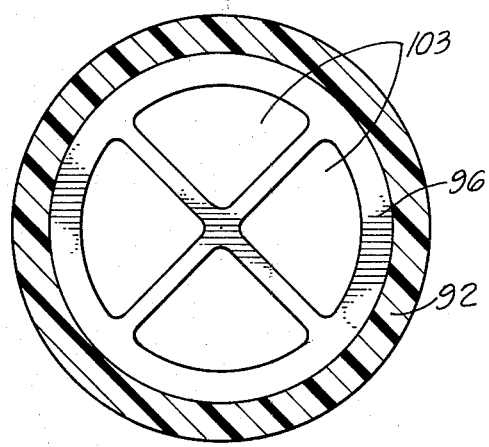
FIG. 11 is a transverse sectional view taken along line 11—11 of FIG. 5.

FIG. 11 is a transverse sectional view taken along line 11—11 of FIG. 5 and shows the optional support 96 with its spokes, the purifier element wall 92, and the ports 103 in said support member.

Figure 12:
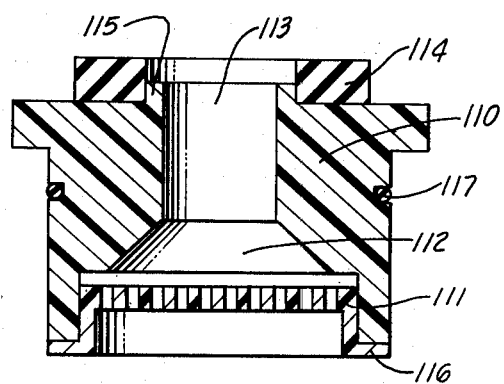
FIG. 12 shows a top wall member within which a foraminous member is retained.

FIG. 12 illustrates another top wall member 110 within which is retained the perforated cup 111. The collector chamber 112 communicates directly with concentric discharge passage 113. The ring gasket 114 on the top wall member is preferably held in position by means of ring projection 115, said gasket surrounding discharge passage 113. The optional outer rim 116 of foraminous cup 111 limits the travel of said cup within the recess of the top wall member. The "O" ring 117 retained within a groove of the top wall member prevents leakage of fluid between the sidewalls of the purifier element and the inserted section of said top wall. The perforated cup 111 has a preferable sliding frictional fit within the recess of the top wall, and is preferably inserted into and separated from said top wall by manual means.

It will be obvious to one skilled in the art that a permeable porous filter can be substituted for the perforated cup 111, or can be used with said cup.

The present invention contemplates alternate embodiments which can include a pleated resin impregnated filter paper, or woven material formed around a reticulated or perforated core for use as a filter element.

While the embodiments of this invention hereinbefore illustrated and described are fully capable of performing the objects and accomplishing the advantages primarily stated, it will be understood that this invention is not restricted to the specific embodiments hereinbefore said forth, but includes all modifications coming within the scope of the claims that follow.

I claim:

1. A filter-purifier cartridge for fluids, said cartridge comprising: a hollow self contained purifier element which functions as the cartridge housing, a tubular filter element disposed entirely within said purifier element and below purifying medium contained between two foraminous members, a washer contiguous to that end wall of said filter element facing the purifying medium; said purifier element being manually joined to, and separable from, a bottom wall member and a top wall member having an inlet and a discharge passage respectively, and means to retain said wall members in position; friction seals disposed between said members and said purifier element, said bottom wall member also functioning as a closer for the lower end of said tubular filter element.

2. The invention defined in claim 1 in which said means for retaining both top and bottom wall members are tie rods having threaded end sections for receiving nuts, each tie rod extending through its associated hole in each of said wall members.

3. The invention defined in claim 1 in which the inlet passage within said bottom wall member is a blind hole which communicates with the interior of said purifier element by means of a plurality of radial passages in said member; the fluid entering an annular passage intermediate a side wall section of said bottom wall member and the side wall of the purifier element housing.

4. The invention defined in claim 1 wherein the side wall of the inserted tubular filter can be maintained in spaced relationship with the side wall of the purifier element.

* * * * *